United States Patent
Mayfield et al.

(10) Patent No.: US 12,238,149 B2
(45) Date of Patent: Feb. 25, 2025

(54) OUTPUTS FROM PERSISTENT HYBRID COLLABORATIVE WORKSPACES

(71) Applicant: Zoom Video Communications, Inc., San Jose, CA (US)

(72) Inventors: Ross Douglas Mayfield, Palo Alto, CA (US); Robert Allen Ryskamp, Mountainview, CA (US); Jeffrey William Smith, Layton, UT (US)

(73) Assignee: Zoom Video Communications, Inc., San Jose, CA (US)

( * ) Notice: Subject to any disclaimer, the term of this patent is extended or adjusted under 35 U.S.C. 154(b) by 0 days.

(21) Appl. No.: 17/733,630

(22) Filed: Apr. 29, 2022

(65) Prior Publication Data
US 2023/0353611 A1    Nov. 2, 2023

(51) Int. Cl.
*H04L 65/401* (2022.01)
*H04L 65/1083* (2022.01)
*H04L 65/403* (2022.01)
*H04L 67/50* (2022.01)

(52) U.S. Cl.
CPC ...... *H04L 65/4015* (2013.01); *H04L 65/1083* (2013.01); *H04L 65/403* (2013.01); *H04L 67/535* (2022.05)

(58) Field of Classification Search
None
See application file for complete search history.

(56) References Cited

U.S. PATENT DOCUMENTS

| | | | |
|---|---|---|---|
| 2009/0307189 A1* | 12/2009 | Bobbitt | G06F 16/00 |
| 2013/0139081 A1* | 5/2013 | Alon | G06Q 10/10 |
| | | | 715/806 |
| 2013/0246901 A1* | 9/2013 | Massand | G06F 40/197 |
| | | | 715/229 |
| 2015/0339050 A1* | 11/2015 | Vong | G06T 11/60 |
| | | | 345/173 |
| 2018/0041457 A1* | 2/2018 | Piira | G06Q 10/10 |
| 2020/0142545 A1* | 5/2020 | Wald | G06N 20/00 |
| 2020/0349120 A1* | 11/2020 | Crane | G06Q 10/101 |
| 2023/0156156 A1 | 5/2023 | Zhang | |

* cited by examiner

*Primary Examiner* — Chris Parry
*Assistant Examiner* — Abderrahmen Chouat
(74) *Attorney, Agent, or Firm* — Kilpatrick Townsend & Stockton LLP

(57) ABSTRACT

Techniques for managing outputs from persistent hybrid collaborative workspaces are disclosed. In an example, a method receives, from a client device, a request to view a history of the virtual collaborative workspace. The method obtains, from a data store, past occurrences associated with one or more virtual collaborative workspace resources within the virtual space. The virtual collaborative workspace resources can include a virtual collaborative workspace, a list of users associated with the virtual collaborative workspace, a shared document, a video stream, or textual messages. The method further transmits indications of the one or more virtual collaborative workspace resources to the client device.

17 Claims, 11 Drawing Sheets

OUTPUTS FROM PERSISTENT HYBRID COLLABORATIVE WORKSPACES

FIELD

This disclosure generally relates to videoconferences. More specifically, but not by way of limitation, this disclosure relates to techniques for managing outputs from persistent hybrid virtual collaborative workspaces.

DETAILED DESCRIPTION

Disclosed techniques relate to managing outputs from persistent hybrid virtual collaborative workspaces. An example of a persistent hybrid collaborative workspace (or a "space") is a virtual environment to which members can join and then interact with resources available within the space and/or interact with other users that are connected to the space. Persistency in this context can refer to a state of the space being stored such that it can be retrieved and recreated in a virtual context. Hybrid in this context can refer to a mixed environment of physical conference rooms that may be attached to the workspace and enable interaction with the workspace as well as devices connected to the workspace from any suitable location. Thus, the hybrid workspace provides a virtual analog to a physical space, but that can be accessed via any suitable means.

Virtual spaces enable users to work in a persistent collaborative environment where they can interact with various resources. For instance, users can interact with each other in real-time through impromptu video meetings, text chats, or by collaborating on documents, data, or other information maintained within the space. Members of the space can connect to and leave the space at their leisure, while the space persists independently of any members who are connected. The resources can collectively form a state, or output, of the space, which can be managed, stored, and/or retrieved at a later time, such as to view a past interaction or review a prior state of a document or other resource. For instance, a video conference provider can store past segments or snapshots of a space or interactions or resources within the space for later retrieval and/or sharing with user devices. Accordingly, a user device can then access a snapshot of a space or resource at a particular point in time. In some cases, historical access can be based on events, such as when a particular user joined or exited a space. With historical access, user devices can then view past events such as recordings of video, chat interactions, and changes made to shared documents.

Figure 1:
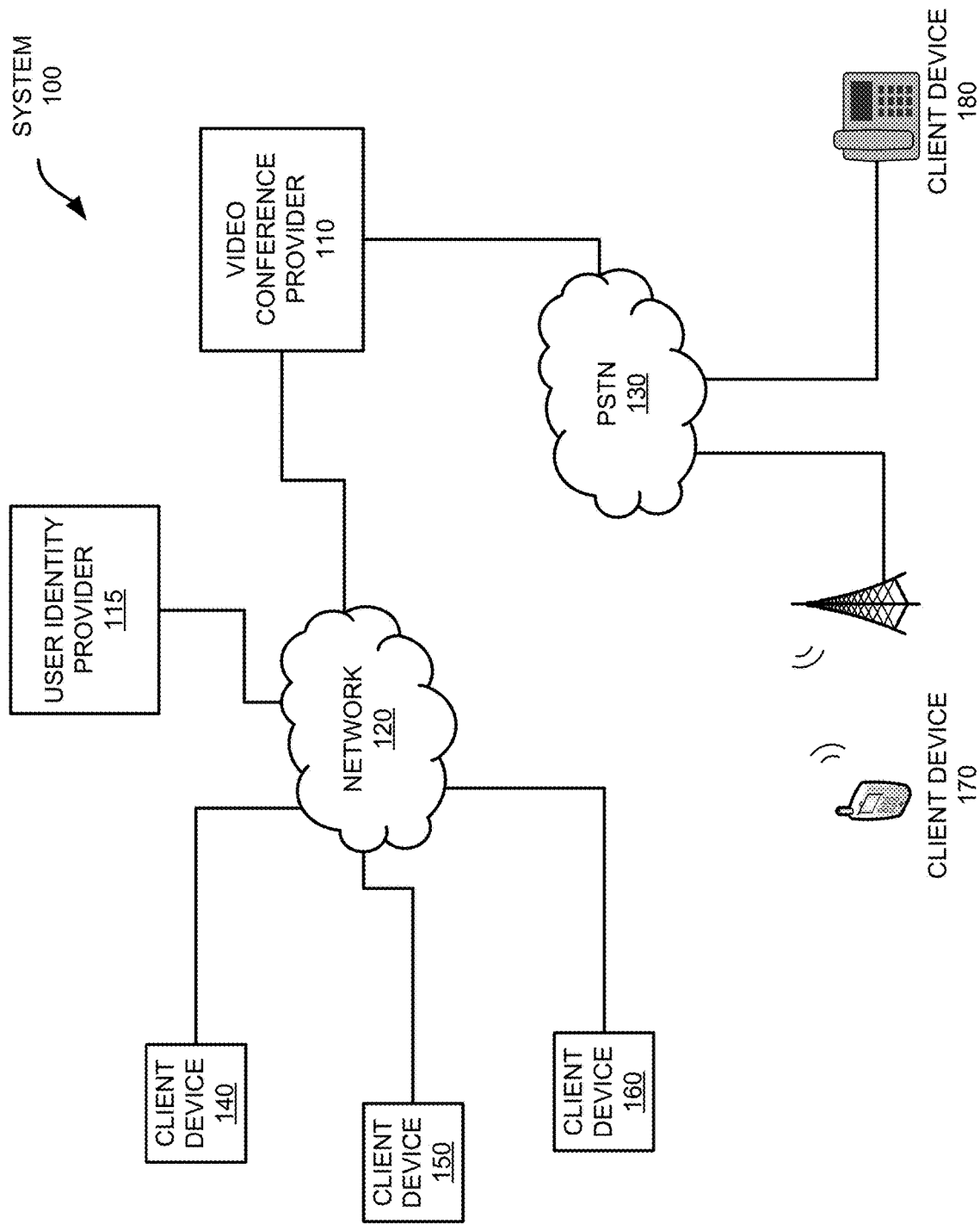
FIG. 1 depicts an example system for providing videoconferencing functionality to client devices.

Turning now to the Figures, FIG. 1 depicts an example system 100 for providing videoconferencing functionality to client devices. In the example depicted by system 100, video conference provider 110 hosts one or more video conferences between client devices 140-180. As further described herein, video conference provider 110 can facilitate access to past segments of persistent hybrid virtual collaborative workspaces, thereby enabling user devices to access a persistent hybrid virtual collaborative workspace as in a previous state, including associated users, documents, messages, and so forth. For instance, video conference provider 110 can enable viewing of past events within the space, such as recordings of past video conferences, chat interactions, when team members have joined or left the space, or other events of interest.

The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Other configurations include a hybrid model in which a video conference provider 110 may supply components to enable a private organization to host private internal video conferences or to connect its system to the video conference provider 110 over a public network. Any of client devices 140-180 can participate in a persistent hybrid virtual collaborative workspace.

System 100 optionally includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity. In some cases, the identity provider 110 can maintain a database or list of conference users who are permitted to join specific persistent hybrid virtual collaborative workspaces.

Figure 2:
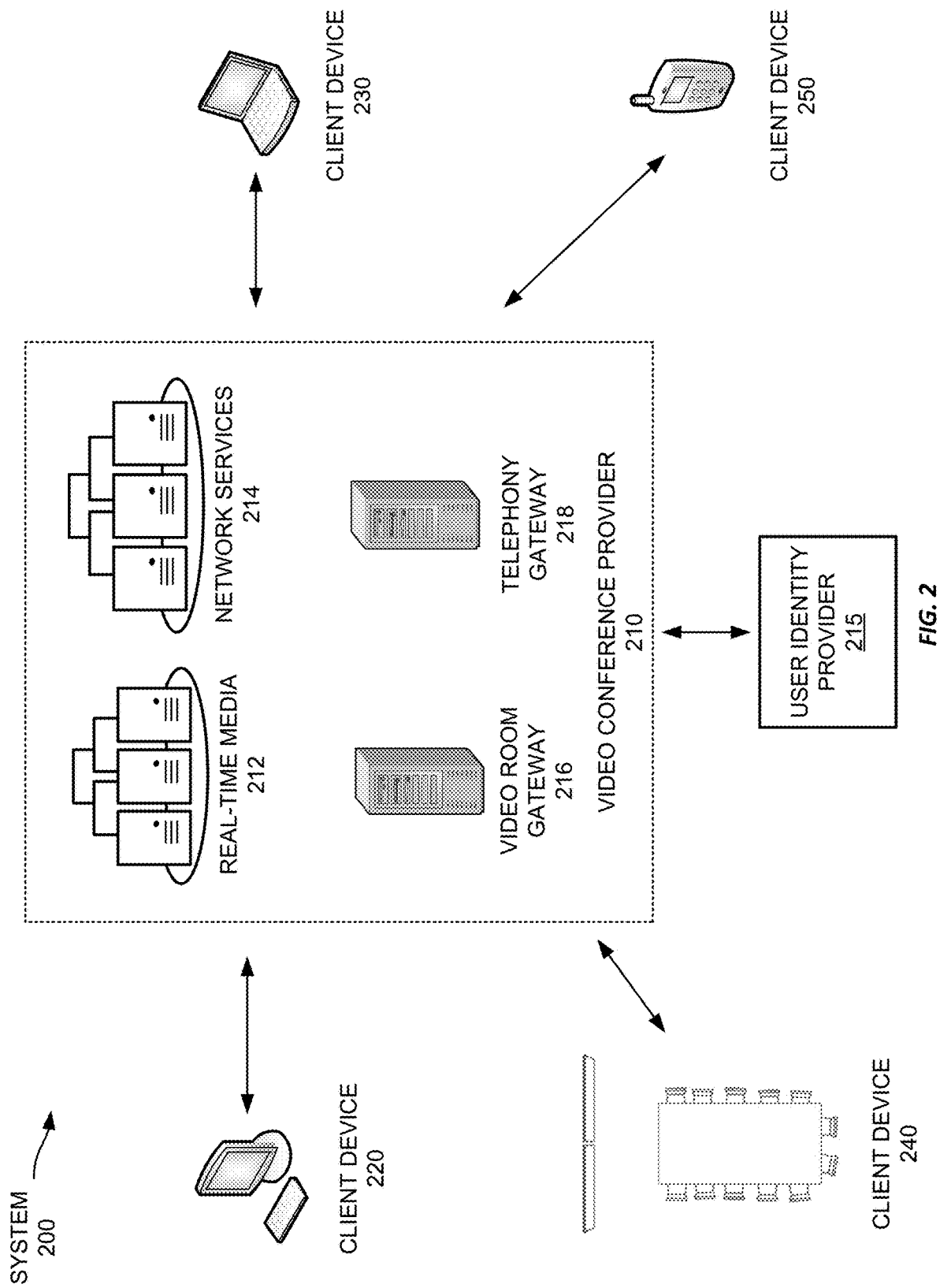
FIG. 2 depicts an example system in which a video conference provider provides videoconferencing functionality to various client devices.

Video conference provider 110 allows clients to create videoconference meetings (or "meetings") and invite others to participate in those meetings as well as perform other related functionality, such as recording the meetings, generating transcripts from meeting audio, generating summaries and translations from meeting audio, generating summaries and translations from meeting audio, manage user functionality in the meetings, enable text messaging during the meetings, create and manage breakout rooms from the main meeting, etc. FIG. 2, described below, provides a more detailed description of the architecture and functionality of the video conference provider 110. It should be understood that the term "meeting" encompasses the term "webinar" used herein.

Meetings facilitated by video conference provider 110 are provided in virtual rooms to which participants are connected. A room in this context is a construct provided by a server that provides a common point at which the various video and audio data is received before being multiplexed and provided to the various participants. While a "room" is the label for this concept in this disclosure, any suitable functionality that enables multiple participants to participate in a common videoconference may be used. Further, in some examples, and as alluded to above, a meeting may also have "a sidebar meeting." A sidebar meeting as provided herein may be a "room" that is associated with a "main" videoconference room or "main meeting." A sidebar meeting can be a part of a persistent hybrid virtual collaborative workspace.

To create a meeting with the video conference provider 110, a user may contact the video conference provider 110 using a client device 140-180 and select an option to create a new meeting. Such an option may be provided in a webpage accessed by a client device 140-180 or client application executed by a client device 140-180. For telephony devices, the user may be presented with an audio menu that they may navigate by pressing numeric buttons on their telephony device.

To create a meeting, the video conference provider 110 may prompt the user for certain information, such as a date, time, and duration for the meeting, a number of participants, a type of encryption to use, whether the meeting is confidential or open to the public, whether a persistent hybrid virtual collaborative workspaces will be used, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users.

During the meeting, the participants may employ their client devices 140-180 to capture audio or video information and stream that information to the video conference provider 110. They also receive audio or video information from the video conference provider 210, which is displayed by the respective client device 140-180 to enable the various users to participate in the meeting. These audio and video streams can form a part of a persistent hybrid virtual collaborative workspace.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode.

To provide such functionality, one or more client devices 140-180 may communicate with the video conference provider 110 using one or more communication networks, such as communication network 120 or the public switched telephone network ("PSTN") 130. The client devices 140-180 may be any suitable computing or communications device that have audio or video capability. For example, client devices 140-180 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Client devices 140-160 contact the video conference provider 110 using communication network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 115 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text messaging with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting. Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

FIG. 2 depicts an example system 200 in which a video conference provider 210 provides videoconferencing functionality to various client devices 220-250. The client devices 220-250 include two conventional computing devices 220-230, dedicated equipment for a video conference room 240, and a telephony device 250. Video conference provider 210 can facilitate persistent hybrid virtual collaborative workspaces, including historical snapshots or segments of such workspaces.

Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs different servers (or groups of servers) to provide video conference functionality and persistent hybrid virtual collaborative workspace functionality. The video conference provider 210 uses one or more real-time media servers 212, one or more network services servers 214, one or more video room gateways 216, and one or more telephony gateway servers 218. Each of these servers 212-218 is connected to one or more communications networks to enable them to collectively provide access to and participation in one or more video conference meetings to the client devices 220-250.

Real-time media servers 212 provide multiplexed multimedia streams to meeting participants, such as client devices 220-250. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex the video from client device 220 and audio feeds when transmitting streams to client device 220. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference provider 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via real-time media servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference provider 210 and across many different real-time media servers 212.

Network services servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client device 220 and provide a meeting ID and passcode. The network services server 214 may use the meeting ID to identify an upcoming or on-going meeting and verify the passcode is correct for the meeting ID. After doing so, the network services servers 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services servers 214 may accept requests to join the meeting from various users.

To handle requests to join a meeting, the network services servers 214 may receive meeting information, such as a meeting ID and passcode, from one or more client devices 220-250. The network services servers 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services servers 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services servers 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services servers 214.

After joining a meeting, client devices will send and receive multimedia streams via the real-time media servers 212, but they may also communicate with the network services servers 214 as needed during meetings. For example, if the meeting host leaves the meeting, the network services servers 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the mainstage or a breakout room if present, recording meetings, etc. Such functionality may be managed by the network services servers 214.

For example, if a host wishes to remove a user from a meeting, they may identify the user and issue a command through a user interface on their client device. The command may be sent to a network services server 214, which may then disconnect the identified user from the corresponding real-time media server 212.

In addition to creating and administering on-going meetings, the network services servers 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services servers 214 may deny the request.

Depending on the functionality provided by the video conference provider, the network services servers 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these video room gateway servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway servers 216 when dedicated video conferencing hardware connects to it, such as device ID information, subscriber information, hardware capabilities, hardware version information etc. Upon receiving such information and authenticating the dedicated video conferencing hardware, the video room gateway servers 216 may interact with the network services servers 214 and real-time media servers 212 to allow the video conferencing hardware to create or join meetings hosted by the video conference provider 210.

The telephony gateway servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3:
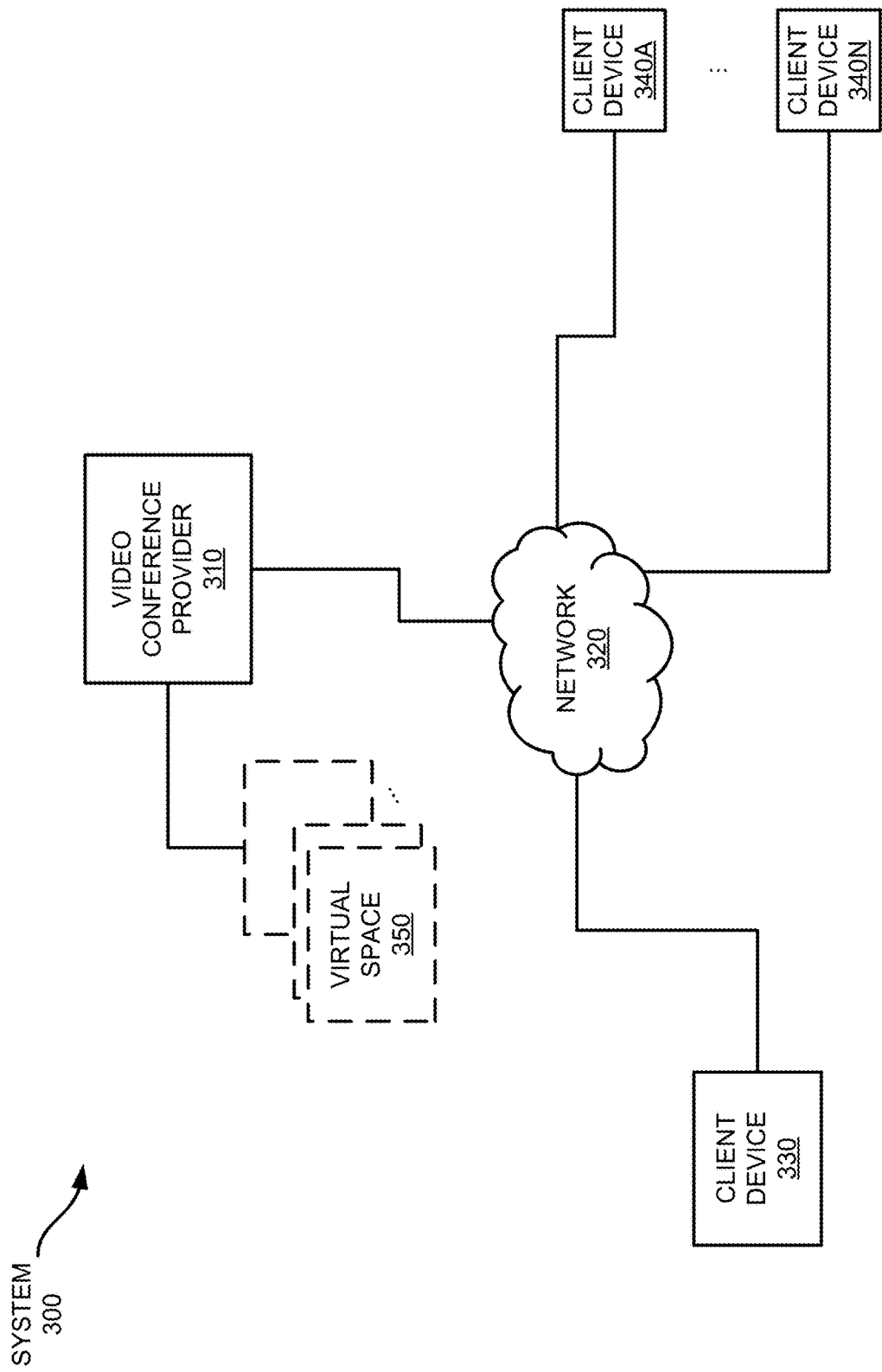
FIG. 3 shows an example system for providing one or more persistent hybrid virtual collaborative workspaces.

Referring now to FIG. 3, FIG. 3 shows an example system 300 for providing one or more persistent hybrid virtual collaborative workspaces. The system 300 shown in FIG. 3 includes a video conference provider 310 that has established and maintains multiple virtual spaces 350. The system 300 also includes multiple client device 330, 340A-N that are connected to the video conference provider 310 via a network. In this example, the network 320 is the internet; however, any communications network or combination of communications networks may be employed. And while the system 300 is depicted as including multiple client device 330, 340A-N, it should be appreciated that some example systems may not include any client devices at any particular time. Rather, the video conference provider 310, which establishes and maintains virtual spaces 350 may be sufficient as a system for persistent hybrid virtual collaborative workspaces, to which one or more client devices may connect.

The video conference provider 310 establishes new spaces at the request of corresponding users and can store the state of any new spaces in a database or a data store. For example, when a space is first established, it may not have any resources or members, other than the user who requested that the space be created. However, as documents, other users, meetings, or other content are added to or created within the space, the video conference provider 310 may add links or references to those resources or users. Thus, in some examples, the various resources may not be stored within the database or even stored by the video conference provider 310. Instead, the space provides a nexus through which such resources may be accessed, such as by traversing a universal resource locator ("URL"), by accessing a document within a document management system or stored in a local networked storage area. However, it should be appreciated that some examples may store individual resources as records within the database along with the configuration and state of the space itself.

Each of the virtual spaces 350 can be established and maintained by the video conference provider 310, which allows members of the respective space to connect to the space, interact with resources available within the space, and interact with other users that are connected to the space. However, each of the virtual spaces 350 persists independently of whether any users are connected to the space or resources are available within the space. Thus, the space remains latent and available for use by any member of the space at any time.

Figure 4:
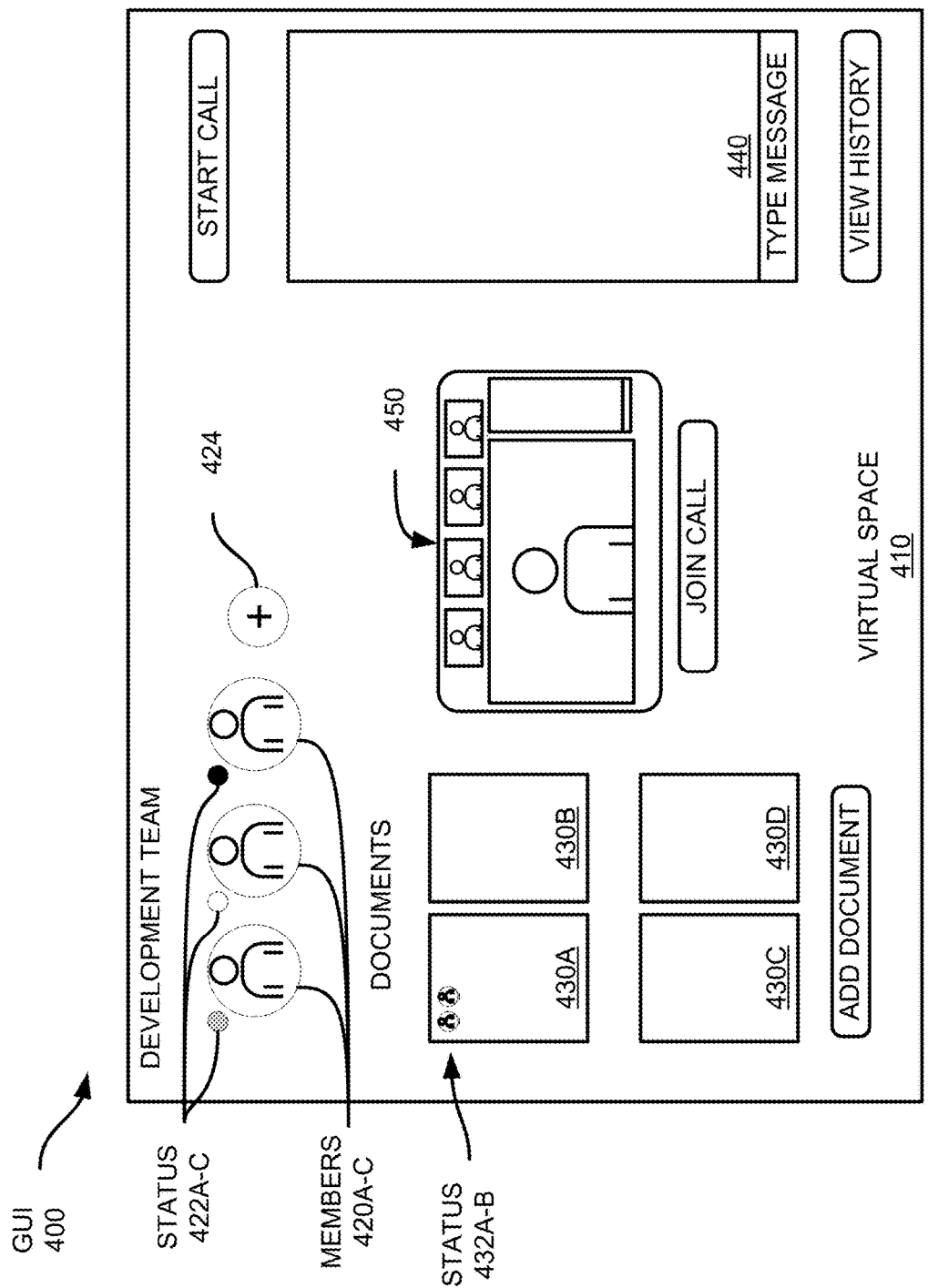
FIG. 4 shows a graphical user interface ("GUI") view of a persistent hybrid virtual collaborative workspace provided by the video conference provider.

Referring now to FIG. 4, FIG. 4 shows a graphical user interface ("GUI") 400 view of a virtual collaborative workspace 410 provided by the video conference provider 310. The virtual space 410 in this example, which can be a persistent hybrid virtual space, has multiple team members 420A-C that have been added to the virtual space 410. In addition, the GUI 400 provides the option 424 to add additional team members to the virtual space 410. The virtual space 410 has also been updated to include four documents 430A-D, which may be accessed by members of the virtual space 410. The virtual space has also been configured to allow members 420A-C to add documents to the virtual space by using the "Add Document" option and to create and participate in video conferences within the space by using the "Start Call" option. Similarly, when a video conference is in-progress within the virtual space 410, the GUI 400 provides a video conference representations 450. This allows members 420A-C of the space to see that a video conference is in-progress and who is within the video conference. The GUI 400 also provides the option to join the call via the "Join Call" button. The virtual space 410 has also been configured with chat functionality 440 to allow the members 440A-C to interact via text chat. Further, the virtual space 410 provides a "View History" option to allow the members 420A-C to view past events within the space, such as recordings of past video conferences, chat interactions, when team members have joined or left the space, or other events of interest.

In addition to providing access to the resources discussed above, the virtual space 410 can also provide status information to assist team members in understanding the current state of the virtual space. For example, as discussed above, the GUI 400 representation of the virtual space 410 provides a status indication that a video conference is in-progress. In this example, the GUI 400 provides a static, stylized representation of a video conference, but the representation does not actually provide any content from the video conference. Instead, a team member 420A-C would need to join the video conference to obtain audio or video feeds or other information shared within the conference. However, in some examples the video conference representation 450 may show the content of the video conference. Thus, the members 420A-C may be able to see the video feeds within the video conference representations 450 or, by selecting an option, may be able to hear the audio from the video conference without actually joining the video conference. When a member 420A-C is observing a video conference in such a manner, the participants within the video conference may be notified that the team member is observing the video conference. Further, some examples may provide options to activate a microphone and camera as an implicit command to join the meeting. Thus, a team member may observe an on-going conference and, if they elect to join, may simply activate their microphone and camera to join the meeting and begin contributing. Such functionality may more closely resemble an in-person meeting in a conference room where team members passing by may notice the meeting and spontaneously decide to join. Alternatively, the participants in the meeting may note that the team member is observing meeting and may send a request to the team member to join the meeting.

Other status information may be provided as well. For example, each of the team members is represented within the virtual space 410 by a stylized portrait of member 420A-C along with a corresponding status indicator 422A-C. The status indicators may indicate the current status of the team members 420A-C. For example, team member 420c has a dark status indicator 422c, indicating that the team member 420c is offline. Team member 420b has a bright status indicator, indicating that they are online and active, while team member 420a has a dimmed status indicator, indicating that they are online, but inactive. Thus, a team member can easily determine whether other team members are available for collaboration. Similarly, documents or other resources may provide indications of whether one or more members of the space is accessing the document or resource. For example, document 430a is being accessed by two members of the virtual space 410 as illustrated by status indicators 432A-B. To gain more information about which members are accessing the document, a user may select one of the indicators 432A-B to obtain information about the corresponding member, such as the member's name. Still other status information may be provided according to other examples.

Figure 5:
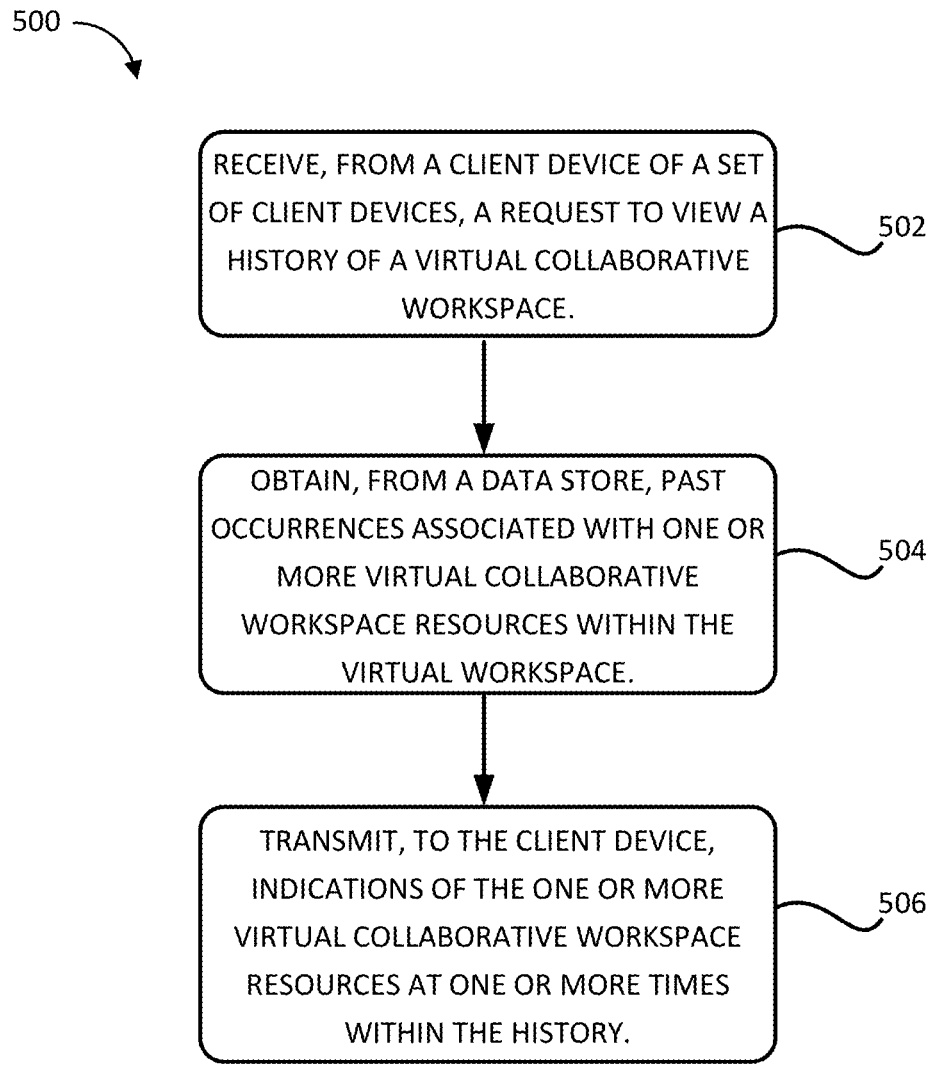
FIG. 5 is a flowchart of an example method for managing persistent hybrid virtual collaborative workspaces.

Being able to access a history of a virtual space enables users to view past events within the space, such as recordings of past video conferences, chat interactions, when team members have joined or left the space, or other events of interest. FIG. 5 depicts one example of managing such a virtual space.

FIG. 5 is a flowchart of an example method 500 for managing persistent hybrid virtual collaborative workspaces. Method 500 can be implemented by video conference provider 110, video conference provider 210, video conference provider 310, or another system. The description of method 500 is made with reference to FIG. 3 for illustrative purposes only. The virtual collaborative workspace and related resources can be archived for retrieval using method 800 as explained with respect to FIG. 8.

It should be appreciated that method 500 provides a particular method for managing persistent hybrid virtual collaborative workspaces. Other sequences of operations may also be performed according to alternative embodiments. For example, alternative embodiments of the present invention may perform the steps outlined above in a different order. Moreover, the individual operations illustrated by method 500 may include multiple sub-operations that may be performed in various sequences as appropriate to the individual operation. Furthermore, additional operations may be added or removed depending on the particular applications. One of ordinary skill in the art would recognize many variations, modifications, and alternatives.

At block 502, method 500 involves receiving, from a client device of a set of client devices, a request to view a history of a virtual collaborative workspace. Referring back to FIG. 3, each virtual space 350 can be managed, stored, and/or retrieved for later access or interaction.

A history of the virtual collaborative workspace can include a series of past changes to the space, events occurring within the space, or recordings or other memorialization of interactions with the space, such as video conference recordings or transcripts as well as text chat transcripts. The history may grow over time as various events or changes occur within the space. To access a history, a user may be presented with a timeline of past events within which they may select individual events or changes that have occurred, which may be referred to as snapshots, or they may zoom into the history by selecting a particular segment of the history. A segment can be defined by a start time and an end time. For instance, a segment could be based on time, for instance 8 AM Eastern US time on May 20, 2021 to 10 AM Eastern US time on May 20, 2021. Or the user may simply select a range within the timeline to view the events or changes that occurred within the space during that time segment. By contrast, a snapshot can be based on a single point in time and therefore may have a more defined time such as a timestamp.

In some cases, a segment or snapshot can correspond to an event. An event can be a significant or noteworthy occurrence in the history of the virtual workspace. Events can be related to any substantial or significant change in resource within the virtual workspace, such as by significantly increasing or decreasing the size of the resource, by changing a version for the resource, by tracking approvals of a draft of the resource, etc. Examples of events include a change in status of one or more users or resources in the workspace (i.e., active or inactive), a physical conference room being associated or disassociated with the workspace, a new document or application being introduced into the workspace, or a document in the workspace being changed. Other examples are possible. For instance, as discussed further with respect to FIG. 10, a video conference provider can connect to a conference room 1030. Physical events occurring in conference room 1030 can be captured by one or more devices and can represent events in the workspace.

Continuing the example, client device 340A requests to view a history of a virtual collaborative workspace 350 from video conference provider 310. For instance, a user of client device 340A can use the "View History" button on GUI 400. The request is then received by video conference provider 310.

At block 504, method 500 involves obtaining from a data store, past occurrences associated with one or more virtual collaborative workspace resources within the virtual collaborative workspace. Examples of past occurrences includes events or changes to resources. Examples of virtual collaborative workspace resources include those discussed with respect to FIG. 4, such a list of users associated with the virtual collaborative workspace (e.g., members 420A-C) and associated user state (e.g., status 422A-C); shared documents (e.g., documents 430A-D), a video conference (e.g., video conference representations 450); and chat messages (e.g., messages 440). Client devices 330 and 340A-N can each display the virtual collaborative workplace (e.g., GUI 400) and interact with the workspace resources. Other examples are possible.

In some cases, a client device requests the entire history or a segment. In other cases, the client device only requests one or more resources such as a document or a message history. In yet other cases, the client device requests only a part of a resource, for instance, a part of a document or a part of a video segment. Additionally, after a first resource is obtained, a request can be made for a second resource, and so forth. Continuing the example, video conference provider 310 obtains part of all of the segment from a data store.

At block 506, method 500 involves transmitting indications of the one or more virtual collaborative workspace resources to the client device at one or more times within the history. For example, if the user selects a range of time within the history covering changes to multiple resources, multiple changes to a single resource, or a combination, the user may receive indications of all resources as well as all changes to the resources within the selected time segment. Continuing the example, video conference provider 310 transmits the requested segments, events, resources, or changes to resources to client device 340A. Client device 340A can then access them as desired, optionally visualizing them in a GUI such as GUI 400 or GUI 600, as discussed further with respect to FIG. 6.

Figure 6:
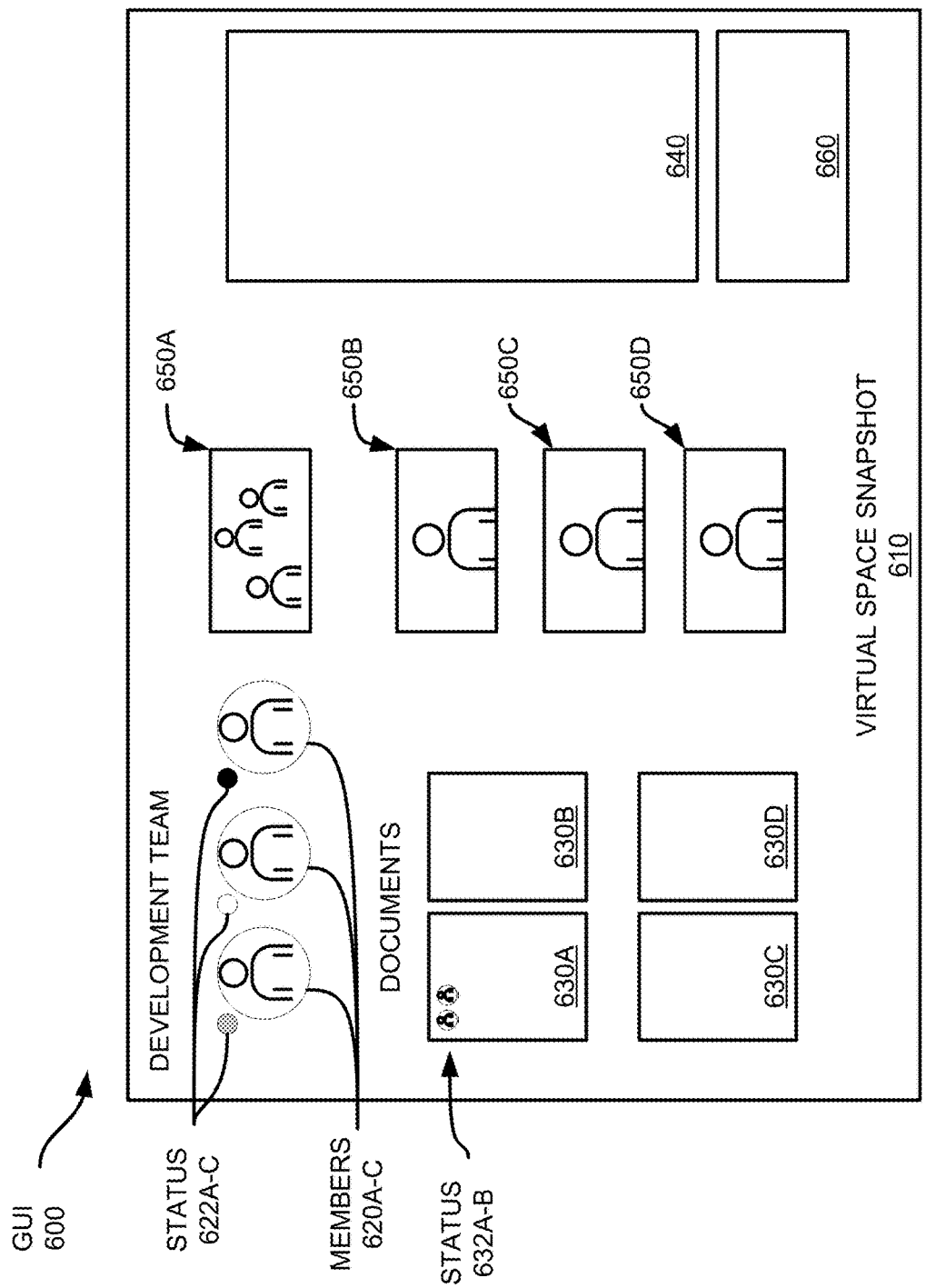
FIG. 6 shows a GUI of an example historical view of a persistent hybrid virtual collaborative workspace provided by the video conference provider.

FIG. 6 shows a GUI 600 of an example historical view of a virtual space provided by the video conference provider. GUI 600 can indicate a state of a virtual space at a point in time, e.g., within a segment or part thereof. When the space is visualized, a user can then interact with the space in its historical state.

GUI 600 depicts similar features as those depicted in GUI 400 discussed with respect to FIG. 4. For example, GUI 600 includes multiple members 620A-C of the space and corresponding status indicators 622A-C, an option 624 to add members to the virtual space 610, multiple documents 630A-D, corresponding status indicators 632A-B, and a chat window 640. However, unlike GUI 400, GUI 600 can visualize video of participants differently as shown in user representations 650A-D. Each representation 650A-D represents individual videos of users participating in the space at the particular historical time. Each of these user representations can be played, paused, and adjusted such that video of each user over time is viewable. In some cases, the video corresponding to the user who requested the segment can also be shown. GUI 600 also includes a time and event window 660, which shows a time represented by the resources depicted and whether any event is represented.

While a conference room need not be included in a space, as depicted, GUI 600 includes video feed of a conference room as shown in representation 650A. For example, as discussed further with respect to FIG. 10, a video conference provider can connect to a conference room 1030 and access data streams from a variety of conference room devices such as cameras, displays, microphones, and so forth. Each of these data streams can be accessed in historical form via GUI 600 and visualized in more detail.

Figure 7:
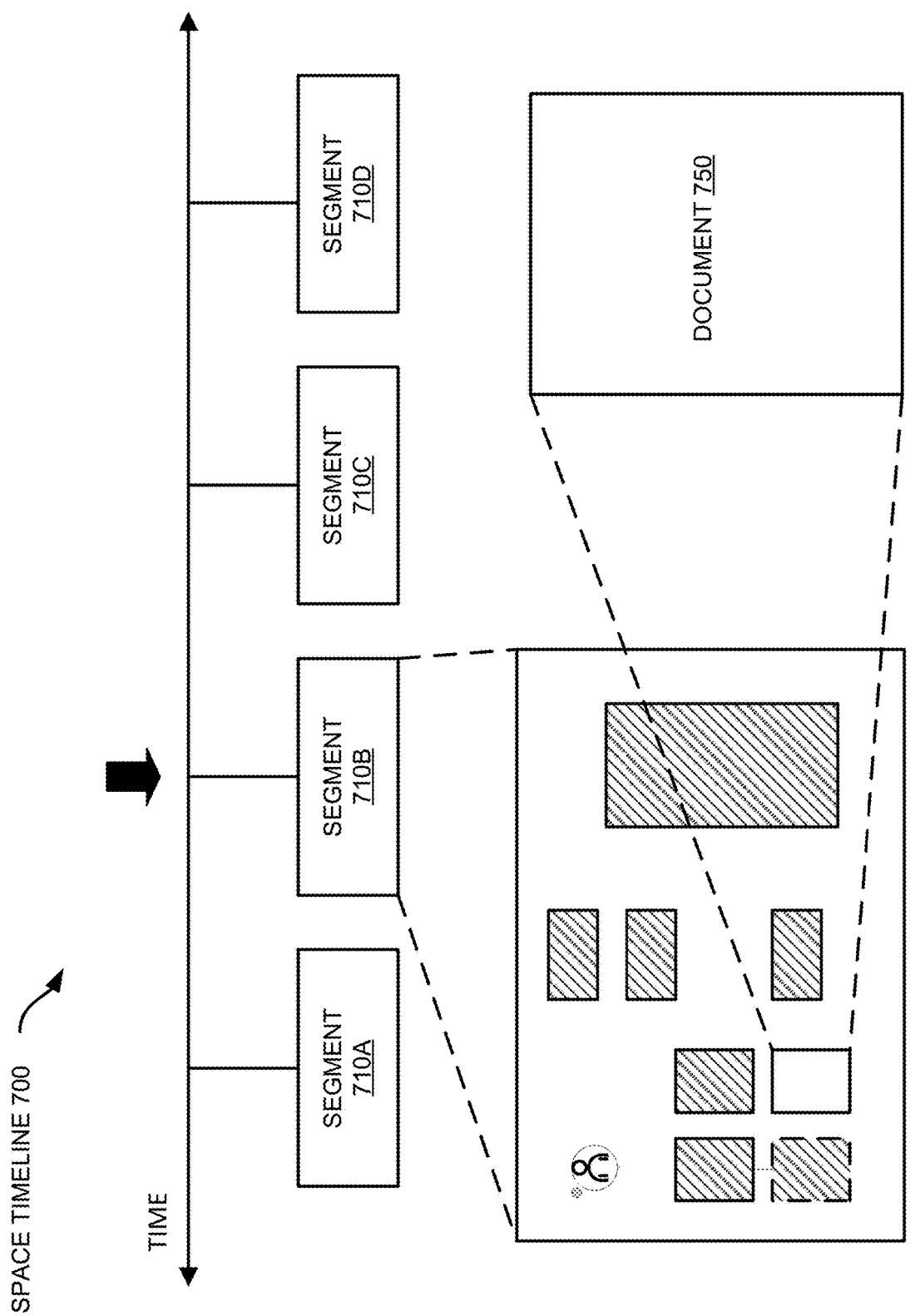
FIG. 7 depicts an example historical timeline of a persistent hybrid virtual collaborative workspace provided by the video conference provider.

In some cases, workspace resources can be visualized on a timeline. FIG. 7 depicts one such example.

FIG. 7 depicts an example historical timeline 700 of a persistent hybrid virtual collaborative workspace provided by the video conference provider. FIG. 7 depicts timeline 700, which includes segments 710A-D. Each of segment 710A-D represents a historical snapshot of the workspace. The virtual collaborative workspace is associated with a set of client devices.

As depicted, a user has selected segment 710B to view in more detail. Selected segment 710B is shown in expanded view. A user can also further expand any of the resources in a visualized segment. For instance, as shown document 750 from segment 710B is further expanded into view. Document 750 can be analyzed, e.g., viewed, searched, printed, and so forth when in expanded view.

In some cases, timeline 700 can show a resource rather than or in addition to segments. For instance, if a given resource such as a document has changed over time, then the timeline may display only the document for clarity, rather than a snapshot of the entire virtual space. Additionally or alternatively, an additional resource timeline may be viewed from within a particular segment, indicating how a particular document has changed within that segment.

As discussed, segments or snapshots of virtual spaces can be accessed on an event basis. Video conference provider 310 can identify an event in real time, e.g., when a user joins the space. In other cases, video conference provider 310 can process historical snapshots and retroactively identify an occurrence of an event. Having identified events can improve access time for subsequent queries from client devices for a segment.

Figure 8:
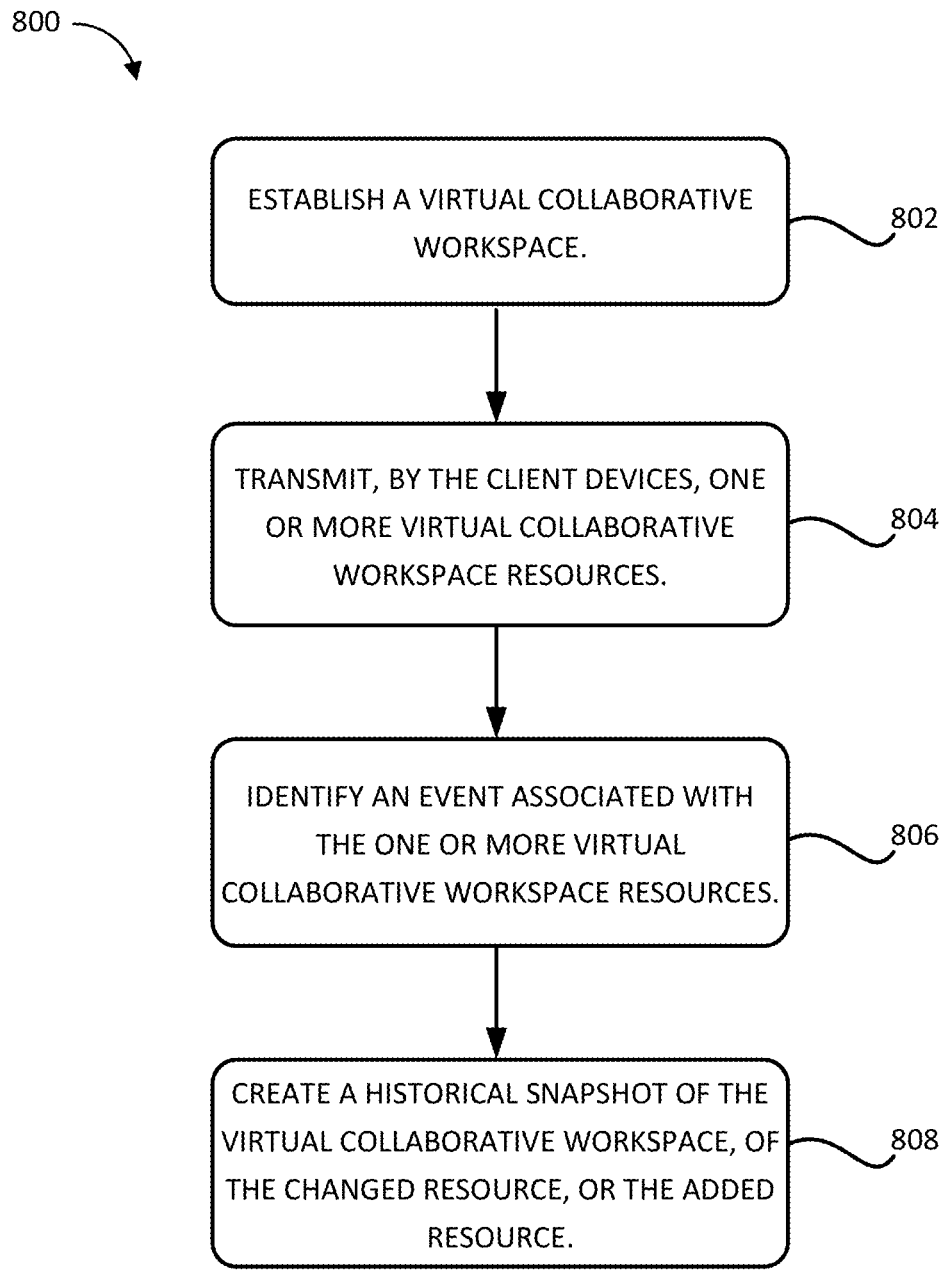
FIG. 8 is a flowchart of an example method for identifying events in persistent hybrid virtual collaborative workspaces.

FIG. 8 is a flowchart of an example method for identifying events in persistent hybrid virtual collaborative workspaces. Method 800 can be implemented by video conference provider 110, video conference provider 210, video conference provider 310, or another system. The description of method 800 is made with reference to FIGS. 3 and 4 for illustrative purposes only.

It should be appreciated that method 800 provides a particular method relating to virtual spaces. Other sequences of operations may also be performed according to alternative embodiments. For example, alternative embodiments of the present invention may perform the operations outlined above in a different order. Moreover, the individual steps illustrated by method 800 may include multiple sub-operations that may be performed in various sequences as appropriate to the individual operation. Furthermore, additional operations may be added or removed depending on the particular applications. One of ordinary skill in the art would recognize many variations, modifications, and alternatives.

At block 802, method 800 involves establishing a virtual collaborative workspace, generally as described above with respect to FIG. 3. Over time, one or more users or resources may be added to the workspace. Examples of virtual collaborative workspace resources include those discussed with respect to block 504 of method 500.

At block 804, method 800 involves accessing, by client devices, one or more virtual collaborative workspace resources. Continuing the example, client devices 330 or 340A-N can access one or more of the virtual collaborative workspace resources while connected to the virtual space. For instance, each of client devices 330 or 340A-N can display the virtual collaborative workspace as depicted in GUI 400, and a user can select one or more resources, e.g., a document 430A-D, to interact with.

Video conference provider 310 can provide updates to each of client devices 330 or 340A-N in real-time or on a periodic basis. For example, in a live video conference, video conference provider 310 may provide a real-time video stream to client devices 330 or 340A-N. But video conference provider 310 may update other virtual collaborative workspace resources (e.g., shared documents 430A-D or messages 440) when those resources are changed by users within the workspace.

At block 806, method 800 involves identifying an event associated with the one or more virtual collaborative resources. Examples of events in virtual collaborative workspace resources include those discussed with respect to block 502 of method 500.

At block 808, method 800 involves creating a historical snapshot of the virtual collaborative workspace, of the changed resource, or the added resource. Examples include a new video conference recording or transcript. Based on the identification of an event, video conference provider 310 can update the virtual collaborative workspace resources with an identification of the event. In some cases, video conference provider 310 can store the updated resources in the data store. Thus, at a later time, when a user accesses the history of the workspace, the newly added snapshot or resource, resource change, or event will be viewable and selectable within the history.

Figure 9:
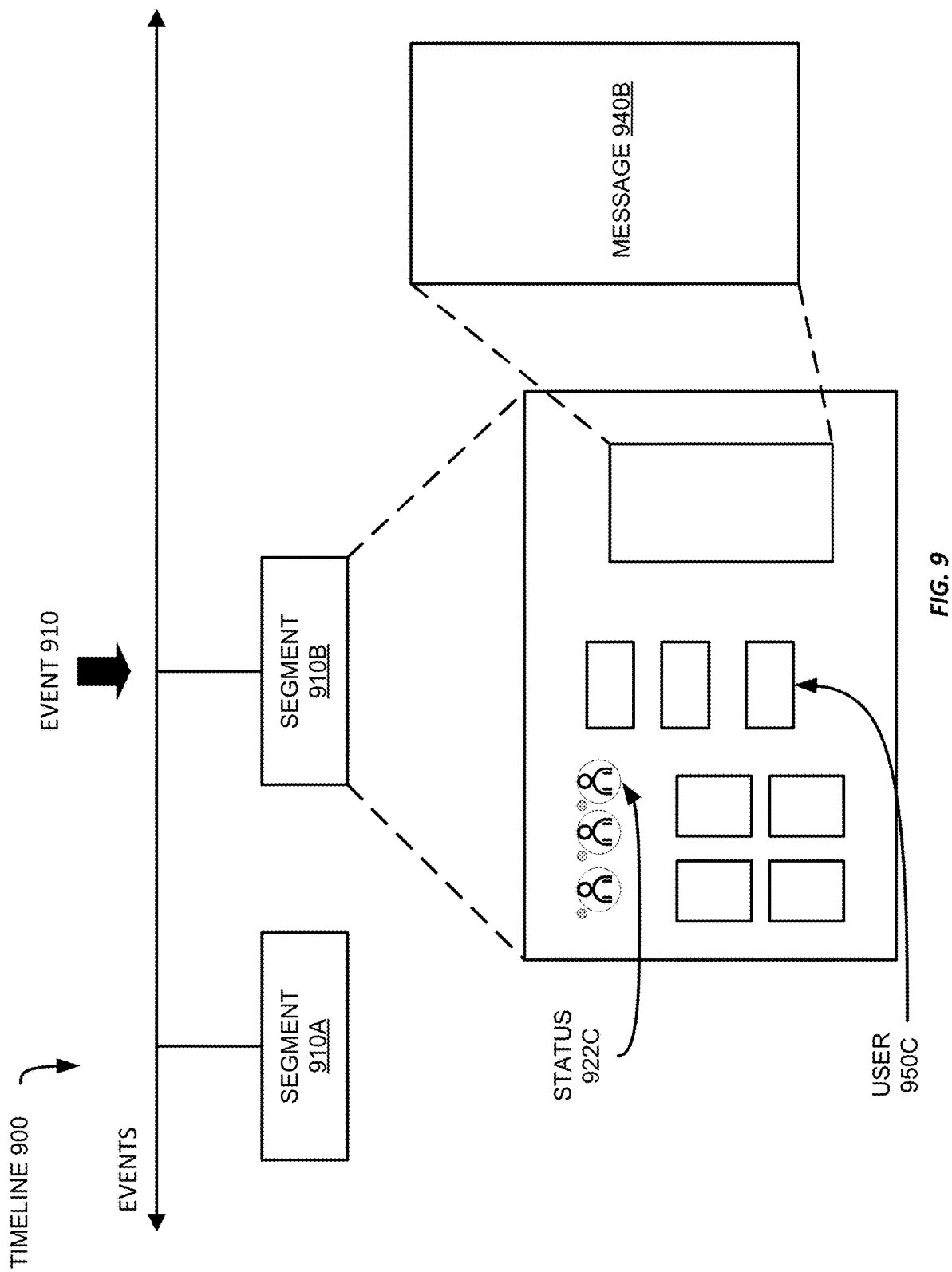
FIG. 9 depicts an example historical event timeline of a persistent hybrid virtual collaborative workspace provided by the video conference provider.

Referring now to FIG. 9, FIG. 9 depicts an example historical event timeline 900 of a virtual space provided by the video conference provider. Timeline 900 depicts segment 910A-B. Each of segment 910A-B represents a historical snapshot. Segment 910B corresponds to event 910. As shown event 910 corresponds to user 950C changing status, as indicated by status 922C. As depicted, a user has selected segment 910B to view in more detail, therefore, segment 910B is shown in expanded view. Additionally, message 940B shown in an expanded view. Similar to FIG. 7, timeline 900 can be configured to show resources which have changed between or as a result of events, in addition to or instead of the entire snapshot of the workspace or in lieu of a segment.

Figure 10:
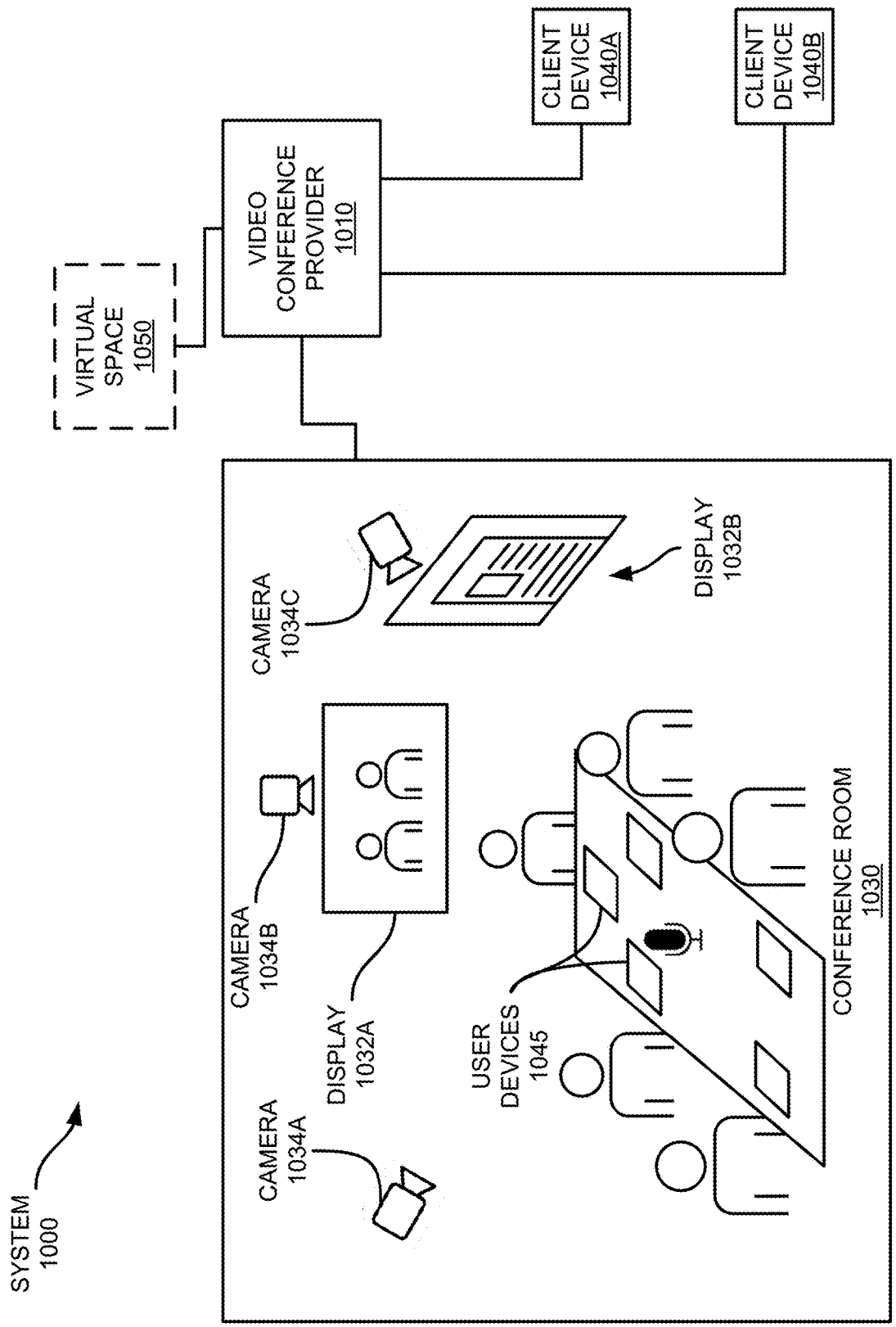
FIG. 10 illustrates an example system for providing persistent hybrid virtual workspaces.

Referring now to FIG. 10, FIG. 10 illustrates an example system for providing persistent hybrid virtual work spaces. The system 1000 includes a video conference provider 1010 that has established and is maintaining a virtual space 1050. In addition, multiple client devices are connected to the video conference provider 1010. One of the client devices includes video conferencing equipment installed within a physical conference room 1030, while two additional client devices 1040A-B are computing devices operated by users remote from the conference room 1030, but that are connected to the virtual space 1050. In this example, the video conference equipment in the conference room 1030 includes two displays 1032A-B and three cameras 1034A-C. In addition, five user devices 1045 are provided as a part of the video conferencing equipment, which are provided in addition to any user devices the attendees of the meeting may have brought with them. The user devices 1045 are integrated into the video conferencing equipment to enable users in the conference room 1030 to control different aspects of the video conferencing equipment, such as content presented on the displays 1032A-B or positioning of one or more of the cameras 1034A-C.

In this example, the conference room 1030 has connected to the video conference provider 1010 and has attached to the virtual space 1050. In this example, the video conferencing equipment includes a computing device (not shown) that controls the cameras 1034A-C, the displays 1032A-B, and the microphone, which is positioned on the conference table, though multiple microphones may be employed in some examples. In addition, the computing device may receive instructions from the user device 1045 as discussed above, such as to control the displays or the cameras, to access content within virtual space 410 or 610, or to interact with one or more team members within virtual space 410 or 610.

After connecting to the video conference provider 1010, one of the users can select a virtual space 1050 to connect to. Once the conference room 1030 is connected to the virtual space 1050, other members of the virtual space 1050 may see that the conference room is attached, such as by being presented with a representation of a video conference, such as the example video conference representations 450, 550 shown in FIGS. 4 and 5. Thus, other members of the virtual space 1050 can see that the meeting is in-progress and can decide whether to observe or join remotely, such as users of client devices 1040A-B. Further, while this example system 1000 shows only one conference room 1030 connected to the space, in some examples, multiple conference rooms may be connected to the same space in one or more video conferences.

After the meeting has concluded, the participants in the conference room 1030 can disconnect from the space, at which time the meeting and a corresponding representation within a GUI may be removed from the virtual space. However, in some examples, a conference room 1030 may remain attached after the participants have concluded a meeting, and thus the video conference may persist along with a representation of the meeting within the space. In one such an example, other members of the space may view the conference room from within the space and interact with it, such as by observing one or more video feeds from the conference room, such as to review information posted on whiteboards or other physical objects within the conference room 930, such as a pinboard. Thus, the physical conference room may become an extension of the virtual space where remote participants can still interact with the conference room, even outside of the context of an active video conference.

Figure 11:
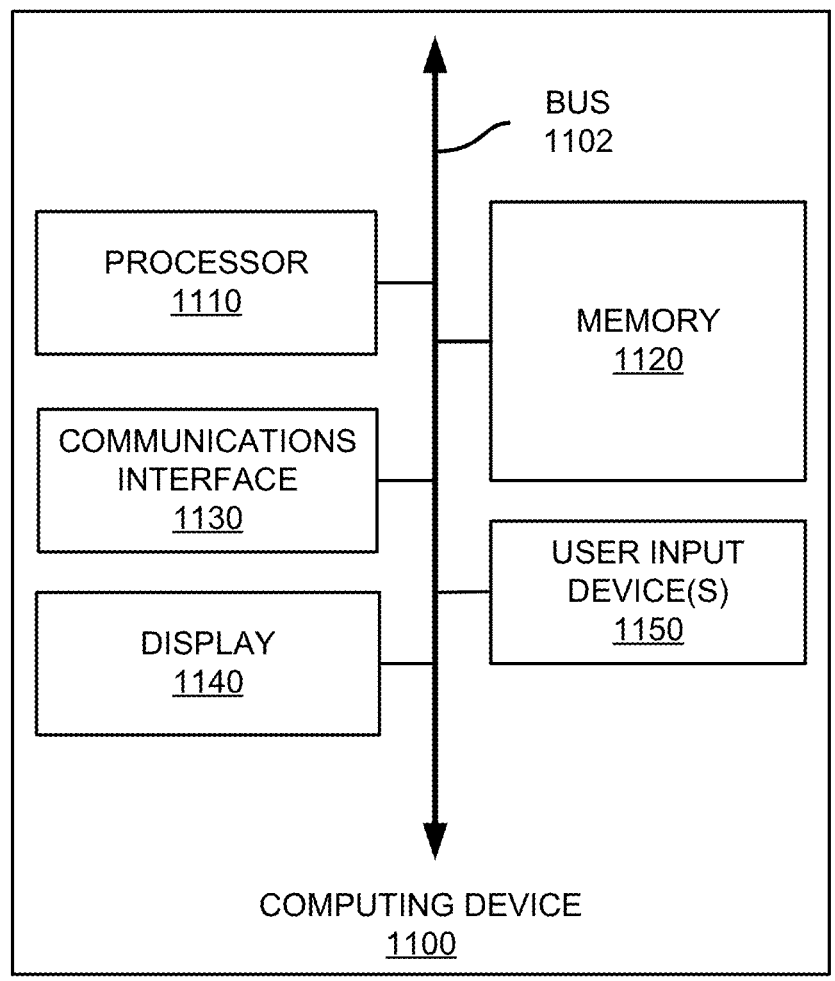
FIG. 11 illustrates an example computing device for providing persistent hybrid virtual workspaces.

FIG. 11 illustrates an example computing device for providing persistent hybrid virtual workspaces. Example computing device 1100 is suitable for use in example systems or methods described herein. The example computing device 1100 includes a processor 1110 which is in communication with the memory 1120 and other components of the computing device 1100 using one or more communications buses 1102. Memory 1120 can include one or more machine learning models that can be used in conjunction with content moderation application 312.

The processor 1110 is configured to execute processor-executable instructions stored in the memory 1120 to perform one or more methods described herein, such as part or all of the methods 500 or 800, described above. The computing device, in this example, also includes one or more user input devices 1150, such as a keyboard, mouse, touchscreen, video input device (e.g., one or more cameras), microphone, etc., to accept user input. The computing device 1100 also includes a display 1140 to provide visual output to a user.

The computing device 1100 also includes a communications interface 1130. In some examples, the communications interface 1130 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification.

Illustration 1 is a system for managing outputs of a virtual collaborative workspace, the system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive, from a client device of a plurality of client devices and via the communications interface, a request to view a history of the virtual collaborative workspace; obtain, from a data store, a plurality of past occurrences associated with one or more virtual collaborative workspace resources within the virtual collaborative workspace, the virtual collaborative workspace resources comprising one or more of: (a) a virtual collaborative workspace status that indicates whether one or more users is active within a particular past duration; (b) a list of users associated with the virtual collaborative workspace, wherein at least one of the users corresponds to one of the plurality of client devices, and wherein each user has an associated user state; (c) a document stored within the virtual collaborative workspace and a corresponding shared document state at one or more times; (d) recordings of one or more virtual conferences attached to the virtual collaborative workspace; or (iv) one or more textual messages transmitted between the plurality of client devices at one or more times; and transmit, via the communications interface and to the client device, indications of the one or more virtual collaborative workspace resources at one or more times in the history.

Illustration 2 is the system of any previous or subsequent illustration, wherein the request comprises an identification of an event that occurred within the virtual collaborative workspace, and wherein the event is one or more of: an additional client device joining the virtual collaborative workspace, the additional client device leaving the virtual collaborative workspace, or a physical conference room being associated or disassociated with the virtual collaborative workspace.

Illustration 3 is the system of any previous or subsequent illustration, wherein the request comprises an identification of an event that occurred within the virtual collaborative workspace, and wherein the event is one or more of: the document being introduced into the virtual collaborative workspace, or the document having changes greater than a threshold.

Illustration 4 is the system of any previous or subsequent illustration, wherein the processor is further configured to execute processor-executable instructions stored in the non-transitory computer-readable medium to: receive, via the communications interface and from the client device a request for an additional virtual collaborative workspace resource that is associated with a timestamp; retrieve, from the data store, the additional virtual collaborative workspace resource; and transmit, via the communications interface and to the client device, the additional virtual collaborative workspace resource.

Illustration 5 is the system of any previous or subsequent illustration, wherein the request identifies a past segment that is represented by a start time and an end time, and wherein the plurality of past occurrences occurred between the start time and the end time Illustration 6 is the system of any previous or subsequent illustration, wherein the processor is further configured to execute processor-executable instructions stored in the non-transitory computer-readable medium to: identify, in the one or more virtual collaborative workspace resources, an event relating to (i) an additional client device joining or leaving the virtual collaborative workspace, or (ii) a change in the document; and responsive to the identification, update the one or more virtual collaborative workspace resources with an identification of the event and sore the updated one or more virtual collaborative resources in the data store.

Illustration 7 is the system of any previous or subsequent illustration, wherein the processor is further configured to execute processor-executable instructions stored in the non-transitory computer-readable medium: receiving, via the communications interface and from the client device, a request for an additional virtual collaborative workspace associated with the history; obtain, from the data store, additional virtual collaborative workspace resources associated with the history; and transmit, via the communications interface, the additional virtual collaborative workspace resources to the client device.

Illustration 8 is a method comprising: receiving, from a client device of a plurality of client devices, a request for a past segment of a virtual collaborative workspace, wherein the virtual collaborative workspace is associated with the plurality of client devices, and wherein the past segment is represented by a start time and an end time; receiving, from a client device of a plurality of client devices, a request to view a history of the virtual collaborative workspace; obtaining, from a data store, a plurality of past occurrences associated with one or more virtual collaborative workspace resources within the virtual collaborative workspace, the virtual collaborative workspace resources comprising one or more of: (a) a virtual collaborative workspace status that indicates whether one or more users is active within a particular past duration; (b) a list of users associated with the virtual collaborative workspace, wherein at least one of the users corresponds to one of the plurality of client devices, and wherein each user has an associated user state; (c) a document stored within the virtual collaborative workspace and a corresponding shared document state at one or more times; (d) recordings of one or more virtual conferences attached to the virtual collaborative workspace; or (iv) one or more textual messages transmitted between the plurality of client devices at one or more times; and transmitting, to the client device, indications of the one or more virtual collaborative workspace resources at one or more times in the history.

Illustration 9 is the method of any previous or subsequent illustration, wherein the request comprises an identification of an event that occurred within the virtual collaborative workspace, and wherein the event is one or more of: an additional client device joining the virtual collaborative workspace, the additional client device leaving the virtual collaborative workspace, or a physical conference room being associated or disassociated with the virtual collaborative workspace.

Illustration 10 is the method of any previous or subsequent illustration, wherein the request comprises an identification of an event that occurred within the virtual collaborative workspace, and wherein the event is one or more of: the document being introduced into the virtual collaborative workspace, or the document having changes greater than a threshold.

Illustration 11 is the method of any previous or subsequent illustration, further comprising: receiving from the client device a request for an additional virtual collaborative workspace resource that is associated with a timestamp; retrieving, from the data store, the additional virtual collaborative workspace resource; and transmitting, to the client device, the additional virtual collaborative workspace resource.

Illustration 12 is the method of any previous or subsequent illustration, wherein the request identifies a past segment that is represented by a start time and an end time, and wherein the plurality of past occurrences occurred between the start time and the end time.

Illustration 13 is the method of any previous or subsequent illustration, further comprising: identifying, in the one or more virtual collaborative workspace resources, an event relating to (i) an additional client device joining or leaving the virtual collaborative workspace, or (ii) a change in the document; and responsive to the identification, updating the one or more virtual collaborative workspace resources with an identification of the event and sore the updated one or more virtual collaborative resources in the data store.

Illustration 14 is a non-transitory computer-readable medium comprising processor-executable instructions configured to cause one or more processors to: receive, from a client device of a plurality of client devices, a request to view a history of a virtual collaborative workspace; obtain, from a data store, a plurality of past occurrences associated with one or more virtual collaborative workspace resources within the virtual collaborative workspace, the virtual collaborative workspace resources comprising one or more of: (a) a virtual collaborative workspace status that indicates whether one or more users is active within a particular past duration; (b) a list of users associated with the virtual collaborative workspace, wherein at least one of the users corresponds to one of the plurality of client devices, and wherein each user has an associated user state; (c) a document stored within the virtual collaborative workspace and a corresponding shared document state at one or more times; (d) recordings of one or more virtual conferences attached to the virtual collaborative workspace; or (iv) one or more textual messages transmitted between the plurality of client devices at one or more times; and transmit, to the client device, indications of the one or more virtual collaborative workspace resources at one or more times in the history.

Illustration 15 is the non-transitory computer-readable medium of any previous or subsequent illustration, wherein the request comprises an identification of an event that occurred within the virtual collaborative workspace, and wherein the event is one or more of: an additional client device joining the virtual collaborative workspace, the additional client device leaving the virtual collaborative workspace, or a physical conference room being associated or disassociated with the virtual collaborative workspace.

Illustration 16 is the non-transitory computer-readable medium of any previous or subsequent illustration, wherein the request comprises an identification of an event that occurred within the virtual collaborative workspace, and wherein the event is one or more of: the document being introduced into the virtual collaborative workspace, or the document having changes greater than a threshold.

Illustration 17 is the non-transitory computer-readable medium of any previous or subsequent illustration, wherein processor-executable instructions are further configured to cause one or more processors to: receive, from the client device a request for an additional virtual collaborative workspace resource that is associated with a timestamp; retrieve, from the data store, the additional virtual collaborative workspace resource; and transmit, to the client device, the additional virtual collaborative workspace resource.

Illustration 18 is the non-transitory computer-readable medium of any previous or subsequent illustration, wherein the past segment is a historical snapshot represented by a timestamp, and wherein the request comprises the timestamp.

Illustration 19 is the non-transitory computer-readable medium of any previous or subsequent illustration, wherein processor-executable instructions are further configured to cause one or more processors to: identify, in the one or more virtual collaborative workspace resources, an event relating to (i) an additional client device joining or leaving the virtual collaborative workspace, or (ii) a change in the document; and responsive to the identification, update the one or more virtual collaborative workspace resources with an identification of the event and sore the updated one or more virtual collaborative resources in the data store.

Illustration 20 is the non-transitory computer-readable medium of any previous or subsequent illustration, wherein processor-executable instructions are further configured to cause one or more processors to: receiving, from the client device, a request for a virtual collaborative workspace associated with the past segment; obtain, from the data store, additional virtual collaborative workspace resources associated with the past segment; and transmit the additional virtual collaborative workspace resources to the client device.

That which is claimed is:

1. A system for managing outputs of a virtual collaborative workspace, the system comprising:
   a non-transitory computer-readable medium;
   a communications interface; and
   a processor communicatively coupled to the non-transitory computer-readable medium and the communications interface, the processor configured to execute processor-executable instructions stored in the non-transitory computer-readable medium to:
   receive, from a client device of a plurality of client devices and via the communications interface, a request to view a history of the virtual collaborative workspace, the request identifying a segment defined by a start time and an end time;
   provide, to the client device, a plurality of past occurrences obtained from a data store, each past occurrence representing a historical snapshot of a state of the virtual collaborative workspace at a different point in time between the start time and the end time;
   receive, from the client device, a selection of a virtual collaborative workspace resource represented in a first past occurrence of the plurality of past occurrences; and
   transmit, via the communications interface and to the client device, a representation of the selected virtual collaborative workspace resource at a corresponding point in time.

2. The system of claim 1, wherein the processor is further configured to execute processor-executable instructions stored in the non-transitory computer-readable medium to:
   receive, via the communications interface and from the client device a request for an additional virtual collaborative workspace resource that is associated with a timestamp;
   retrieve, from the data store, a representation of the additional virtual collaborative workspace resource according to the timestamp; and
   transmit, via the communications interface and to the client device, the representation of the additional virtual collaborative workspace resource.

3. The system of claim 1, wherein the processor is further configured to execute processor-executable instructions stored in the non-transitory computer-readable medium to:
   identify, in the one or more virtual collaborative workspace resources, an event relating to a change in a document stored within the virtual collaborative workspace;
   responsive to the identification, update the one or more virtual collaborative workspace resources with an identification of the event and store the updated one or more virtual collaborative resources in the data store; and
   generate a new segment based on the updated one or more virtual collaborative resources.

4. The system of claim 1, wherein the processor is further configured to execute processor-executable instructions stored in the non-transitory computer-readable medium:
   receive, via the communications interface and from the client device, a request for an additional virtual collaborative workspace associated with the history;
   obtain, from the data store, additional virtual collaborative workspace resources associated with the history; and
   transmit, via the communications interface, the additional virtual collaborative workspace resources to the client device.

5. The system of claim 1, wherein a virtual collaborative workspace resources comprises:
   a list of a plurality of users, wherein at least one of the users corresponds to one of the plurality of client devices, and wherein each user has an associated user state; and
   a virtual collaborative workspace status that indicates whether each of one or more users was active within a particular past duration.

6. The system of claim 5, wherein the virtual collaborative workspace resource further comprises:
   a list of users associated with the virtual collaborative workspace, wherein at least one of the users corresponds to one of the plurality of client devices, and wherein each user has an associated user state; and
   a document stored within the virtual collaborative workspace and a corresponding shared document state at one or more times.

7. The system of claim 1, wherein the processor is further configured to execute processor-executable instructions stored in the non-transitory computer-readable medium to create a historical snapshot of the virtual collaborative workspace that comprises the plurality of past occurrences.

8. A method comprising:
   receiving, from a client device of a plurality of client devices, a request to view a history of a virtual collaborative workspace, the request identifying a segment defined by a start time and an end time;
   providing, to the client device, a plurality of past occurrences obtained from a data store, each past occurrence representing a historical snapshot of a state of the virtual collaborative workspace at a different point in time between the start time and the end time;

receiving, from the client device, a selection of a virtual collaborative workspace resource represented in a first past occurrence of the plurality of past occurrences; and transmitting, to the client device, a representation of the selected virtual collaborative workspace resource at a corresponding point in time.

9. The method of claim 8, further comprising:

receiving from the client device a request for an additional virtual collaborative workspace resource that is associated with a timestamp;

retrieving, from the data store, a representation of the additional virtual collaborative workspace resource according to the timestamp; and transmitting, to the client device, the representation of the additional virtual collaborative workspace resource.

10. The method of claim 8, further comprising:

identifying, in the one or more virtual collaborative workspace resources, an event relating to (i) an additional client device joining or leaving the virtual collaborative workspace, or (ii) a change in a document stored within the virtual collaborative workspace;

responsive to the identification, updating the one or more virtual collaborative workspace resources with an identification of the event and sore the updated one or more virtual collaborative resources in the data store; and generate a new segment based on the updated one or more virtual collaborative resources.

11. The method of claim 8, wherein a virtual collaborative workspace resources comprises:

a list of a plurality of users, wherein at least one of the users corresponds to one of the plurality of client devices, and wherein each user has an associated user state; and a virtual collaborative workspace status that indicates whether one or more users is active within a particular past duration.

12. A non-transitory computer-readable medium comprising processor-executable instructions configured to cause one or more processors to:

receive, from a client device of a plurality of client devices and via a communications interface, a request to view a history of a virtual collaborative workspace, the request identifying a segment defined by a start time and an end time;

provide, to the client device, a plurality of past occurrences obtained from a data store, each past occurrence representing a historical snapshot of a state of the virtual collaborative workspace at a different point in time between the start time and the end time;

receive, from the client device, a selection of a virtual collaborative workspace resource represented in a first past occurrence of the plurality of past occurrences; and transmit, via the communications interface and to the client device, a representation of the selected virtual collaborative workspace resource at a corresponding point in time.

13. The non-transitory computer-readable medium of claim 12, wherein processor-executable instructions are further configured to cause one or more processors to:

receive, from the client device a request for an additional virtual collaborative workspace resource that is associated with a timestamp;

retrieve, from the data store, a representation of the additional virtual collaborative workspace resource according to the timestamp; and transmit, via the communications interface and to the client device, the representation of the additional virtual collaborative workspace resource.

14. The non-transitory computer-readable medium of claim 12, wherein processor-executable instructions are further configured to cause one or more processors to:

identify, in the one or more virtual collaborative workspace resources, an event relating to a change in a document stored within the virtual collaborative workspace;

responsive to the identification, update the one or more virtual collaborative workspace resources with an identification of the event and sore the updated one or more virtual collaborative resources in the data store; and generate a new segment based on the updated one or more virtual collaborative resources.

15. The non-transitory computer-readable medium of claim 12, wherein processor-executable instructions are further configured to cause one or more processors to:

receive, from the client device, a request associated with the first past occurrence;

obtain, from the data store, additional virtual collaborative workspace resources associated with the first past occurrence; and transmit the additional virtual collaborative workspace resources to the client device.

16. The non-transitory computer-readable medium of claim 15, wherein the request comprises an identification of an event that occurred within the virtual collaborative workspace, and wherein the event is a physical conference room being associated or disassociated with the virtual collaborative workspace.

17. The non-transitory computer-readable medium of claim 12, wherein the virtual collaborative workspace resource comprises:

a list of a plurality of users, wherein at least one of the users corresponds to one of the plurality of client devices, and wherein each user has an associated user state; and a virtual collaborative workspace status that indicates whether one or more of the users is active within a particular past duration.

* * * * *